Patented Oct. 5, 1937

2,094,934

UNITED STATES PATENT OFFICE 2,094,934

HYDROHALOGENATED RUBBER HALIDES

Herbert A. Winkelmann, Chicago, Ill., assignor, by mesne assignments, to Marbo Patents Inc., a corporation of Delaware No Drawing. Application June 5, 1935, Serial No. 25,087

5 Claims. (Cl. 260—1)

This invention relates to the reaction products of rubber with halogens and hydrogen halides. More particularly, it relates to the product obtained by reacting rubber with chlorine and hydrogen chloride in successive stages.

It has been proposed to react rubber solutions with hydrogen chloride to produce rubber hydrochloride and then chlorinate solutions of rubber hydrochloride to obtain a chlorinated rubber hydrochloride. Such products differ from the composition of the present invention which is believed to be in whole or in part a hydrochlorinated rubber chloride.

There is also a theory which is probably untenable that during the chlorination of solid rubber with gaseous chlorine some of the hydrogen chloride produced during the substitution reaction will combine with the unreacted rubber or with the rubber chloride. The product obtained by such reaction, however, is probably entirely rubber chloride. It is a soluble product which in thin sheet form is readily penetrated by turpentine.

It has also been proposed to react rubber including rubber in its undissolved state with liquefied and with gaseous hydrogen chloride, as described and claimed in the patent to Gebauer-Fuelnegg and Moffett, No. 1,980,396. The product obtained with liquefied hydrogen chloride and solid rubber at low temperatures below −35° C. such as −80° C. is a soluble type rubber hydrochloride which in thin sheet form is readily penetrated by turpentine. The product is amorphous as shown by X-ray analysis, and is composed essentially of asymmetrical rubber hydrochloride. The product made at temperatures below −35° C. is soluble at room temperature in benzol to above 3%, and is designated as soluble type rubber hydrochloride or turpentine non-resistant rubber hydrochloride.

In the application of Gebauer-Fuelnegg and Moffett, Serial No. 3804, there is disclosed a process of reacting solid rubber with liquefied chlorine. The product obtained by reacting solid rubber with liquefied chlorine at about −30° C. is a very insoluble type rubber chloride which is practically insoluble in solvents such as benzol and toluene, and resistant to turpentine, thus differing radically from rubber chlorides previously known which are all soluble even above 10% concentration in benzol and toluene.

It is an object of this invention to produce a composition of rubber hydrochloride and rubber chloride which may be dissolved in benzol, toluene, ethylene dichloride, and other solvents and cast into films which are relatively resistant to turpentine.

Another object is to produce a hydrochlorinated rubber chloride.

Another object is to produce a sheet or coating having a protective surface of insoluble rubber chloride.

Further objects will become apparent on reading the specification.

In the present invention a sheet of rubber is dipped into liquefied chlorine and after a length of time, depending on the characteristics of the final product desired, is removed and dipped into liquefied hydrogen chloride. Where the sheet is almost entirely chlorinated and then hydrochlorinated, the product is most resistant to solvents but is quite hard and stiff. Where the sheet is exposed to liquefied chlorine less than one minute and then dipped into liquefied hydrogen chloride for viz. 20 minutes, a product is obtained which has a hard surface of chlorinated rubber and a center of hydrochlorinated rubber. Whether the product is something more than a mixture of chlorinated rubber and rubber hydrochloride is not definitely known, but it is believed to be at least in part a hydrochlorinated rubber chloride. The resulting product is dissolved in benzol, ethylene dichloride or other solvents, and cast into sheets or films, is considerably more resistant to penetration by turpentine than rubber hydrochloride made entirely with liquefied hydrogen chloride at below −35° C., and more flexible and more soluble than rubber chloride made with liquefied chlorine.

The following table illustrates the invention, particularly in its application to the making of transparent sheets or films of .001" thickness, suitable for wrapping purposes.

Pale crepe rubber of approximately .02" thickness is dipped in liquefied chlorine at about −40° C., followed by treatment with liquefied hydrogen chloride at −90° C. The sheets are made by casting 6% solutions of the reaction product on a surface, drying and stripping. The turpentine resistance is measured by the time required to penetrate these sheets of approximately .001" thickness.

Table

| Treatment | | Analysis | Residue | Sheet | | Turpentine resistance |
|---|---|---|---|---|---|---|
| Cl | HCl | | | Color | Clarity | |
| | Min. | | | | | |
| 1 min.. | 3 | 41.21 | Large | Yellow | Poor | Several hrs. |
| 1 min.. | 7 | 43.21 | ...do | O. K. | Fair | 20 minutes. |
| 7 sec... | 15 | 36.69 | Little | ...do | Good | 14 minutes. |
| 2 sec... | 15 | 37.00 | ...do | ...do | Fair | 11 minutes. |
| 1 sec... | 20 | 37.05 | Very little | ...do | ...do | 25 minutes. |

These products are hard on the surface. On removal from the liquid HCl they are hard and never mushy as is the case with the straight HCl treatment. They expand less on removal.

The following examples will further illustrate the invention:

Pale crepe rubber of about .02" thickness is dipped in liquefied chlorine at atmospheric pressure at a temperature of about −40° C. for about five seconds, removed and immediately plunged into liquefied hydrogen chloride at atmospheric pressure and a temperature of approximately −90° C. for twenty minutes. A sheet is obtained which has expanded little compared to the product made solely with liquefied hydrogen chloride. It is believed to be composed essentially of a core of rubber hydrochloride and a surface of rubber chloride. It is quite hard and stiff, and does not soften to any appreciable extent. By milling plasticizers such as butyl stearate, or chlorinated paraffin into the rubber and then carrying out the reaction, softer and more flexible products are obtained.

The rubber may be coated on various articles such as sheets of metal, metal wire, and then reacted quickly with chlorine for such a time that the chlorine does not penetrate the rubber and contact the metal, and then with liquefied hydrogen chloride which in its liquefied condition and in the absence of moisture has practically no effect on metal, including iron and copper. The rubber coated metal or other coated material such as wood, cloth or paper may be reacted with dry hydrogen chloride alone. However, the use of liquefied chlorine in conjunction with liquefied hydrogen chloride has advantages such as shortness of time to produce an oil and solvent resistant chlorine containing rubber derivative.

This reaction product of rubber, chlorine and hydrogen chloride, as above described, may be made into a homogeneous mixture by milling it with magnesium oxide, magnesium carbonate or similar stabilizers as described in my copending application, S. N. 11,665. The preferred stabilizer is magnesium oxide which may be used in amounts as low as 2 or 3% with good results, but where the proportion of chlorinated rubber is high it is advisable to use 10 or 20% magnesium oxide. The homogeneous composition of rubber hydrochloride and rubber chloride which may be, or at least contain, hydrochlorinated rubber chloride is particularly useful for molding into articles of manufacture such as dishes, calendering into thin sheets suitable for wrapping purposes, or dissolving in solvents for various coating and casting purposes.

It is to be understood that many details of the present invention may be varied without departing from the spirit of the invention. Any rubber including scrap, reclaim, partially vulcanized, gutta percha, balata, and the like may be used. The term rubber as used in the claim is intended to include rubber and equivalent materials. Also the other halogens and hydrohalides than chlorine and hydrogen chloride may be used. The rubber is preferably in thin sheet form, but may be in lump mass. Solutions of rubber successively reacted with gaseous chlorine to incomplete addition such that double bonds are still available for hydrochlorination, and then the reaction completed by hydrochlorination, with gaseous hydrogen chloride give homogeneous and more soluble products than obtained with solid rubber and liquefied reagents. Solid rubber may also successively be reacted with gaseous chlorine under pressure to incomplete reaction and penetration, and then the reaction and penetration completed with gaseous hydrogen chloride under substantial superatmospheric pressure. In this case the product obtained with gaseous chlorine and hydrogen chloride will vary in solubility according to the amount and time of reaction with gaseous hydrogen chloride, provided the gaseous hydrogen chloride is added above about −50° C. Liquefied hydrogen chloride under pressure and at various temperatures including room temperature, may also be used after partial chlorination of solid rubber, and also liquefied chlorine under pressure at various temperatures. However, for maximum speed and ease of reaction the reaction is carried out on solid thin sheets of rubber successively with liquefied chlorine at atmospheric pressure, followed by liquefied hydrogen chloride at atmospheric pressure.

I claim:

1. The method which comprises first partially reacting rubber with chlorine and then reacting the resulting product with hydrogen chloride which is free of substantial amounts of chlorine.

2. The method which comprises first partially reacting a solid mass of rubber with chlorine to produce a surface of rubber chloride, and then reacting the mass with hydrogen chloride which is free of substantial amounts of chlorine until the rubber mass is substantially entirely reacted to a heterogeneous mass of rubber chloride and rubber hydrochloride.

3. The method which comprises reacting a solid mass of rubber with chlorine for a time insufficient to completely react the mass, and reacting the mass with hydrogen chloride to complete the reaction.

4. The method which comprises reacting a solid mass of rubber with liquefied chlorine for a time insufficient to completely react the mass, and reacting the mass with liquefied hydrogen chloride to complete the reaction.

5. The method which comprises contacting a solid mass of rubber with chlorine to produce a surface of chlorinated rubber and contacting the mass with liquefied hydrogen chloride at substantially below −35° C. to produce a core of amorphous rubber hydrochloride.

HERBERT A. WINKELMANN.